United States Patent [19]

Leining

[11] Patent Number: 4,631,780
[45] Date of Patent: Dec. 30, 1986

[54] HAND SKINNER DEVICE

[75] Inventor: Lyndon R. Leining, Austin, Minn.

[73] Assignee: Geo. A. Hormel & Co., Austin, Minn.

[21] Appl. No.: 727,576

[22] Filed: Apr. 26, 1985

[51] Int. Cl.$^4$ .............................................. A22B 5/16
[52] U.S. Cl. .......................................... 17/21; 99/589
[58] Field of Search ................... 17/18, 21, 19, 50, 62, 17/21; 99/588, 589

[56] References Cited

U.S. PATENT DOCUMENTS

| 4,071,923 | 2/1978 | Smith | 17/21 |
| 4,186,461 | 2/1980 | Leining | 17/21 |
| 4,451,953 | 6/1984 | Leining | 17/21 |

Primary Examiner—Willie G. Abercrombie
Attorney, Agent, or Firm—Herman H. Bains

[57] ABSTRACT

A hand skinner device for removing strips of skin from animal carcasses comprises an elongate handle including an air motor and having a housing mounted at one end thereof. The housing has a skinning blade supported thereon and a revolvable tooth roll assembly for engaging and pulling the skin against the skinning blade. A pair of uniquely constructed clips clamp the blade downwardly against the housing and clamp the tooth roll shaft upwardly against the housing. The multifunctional clips permit ready assembly and disassembly of the skinning device for cleaning and replacement of parts.

12 Claims, 6 Drawing Figures

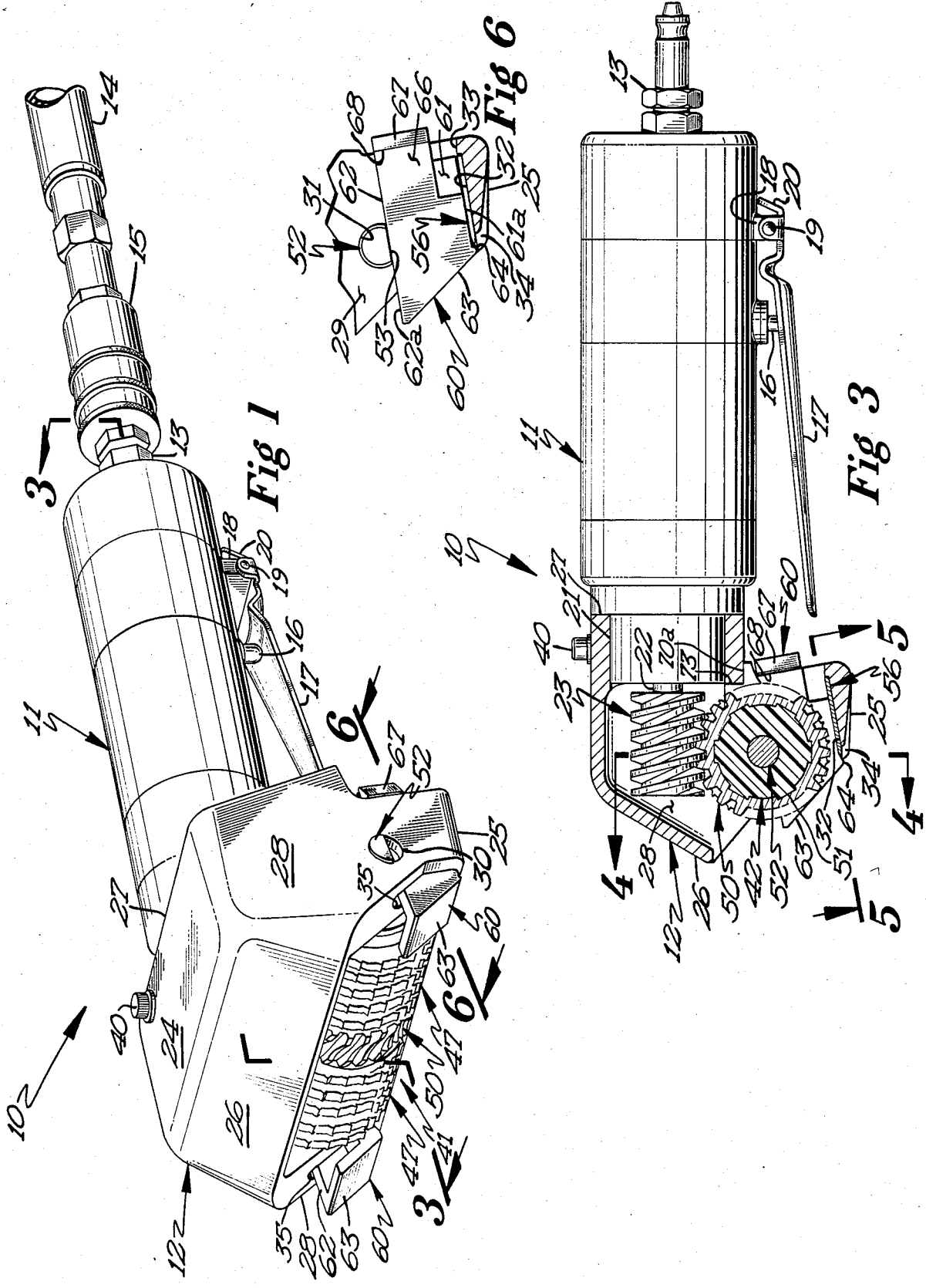

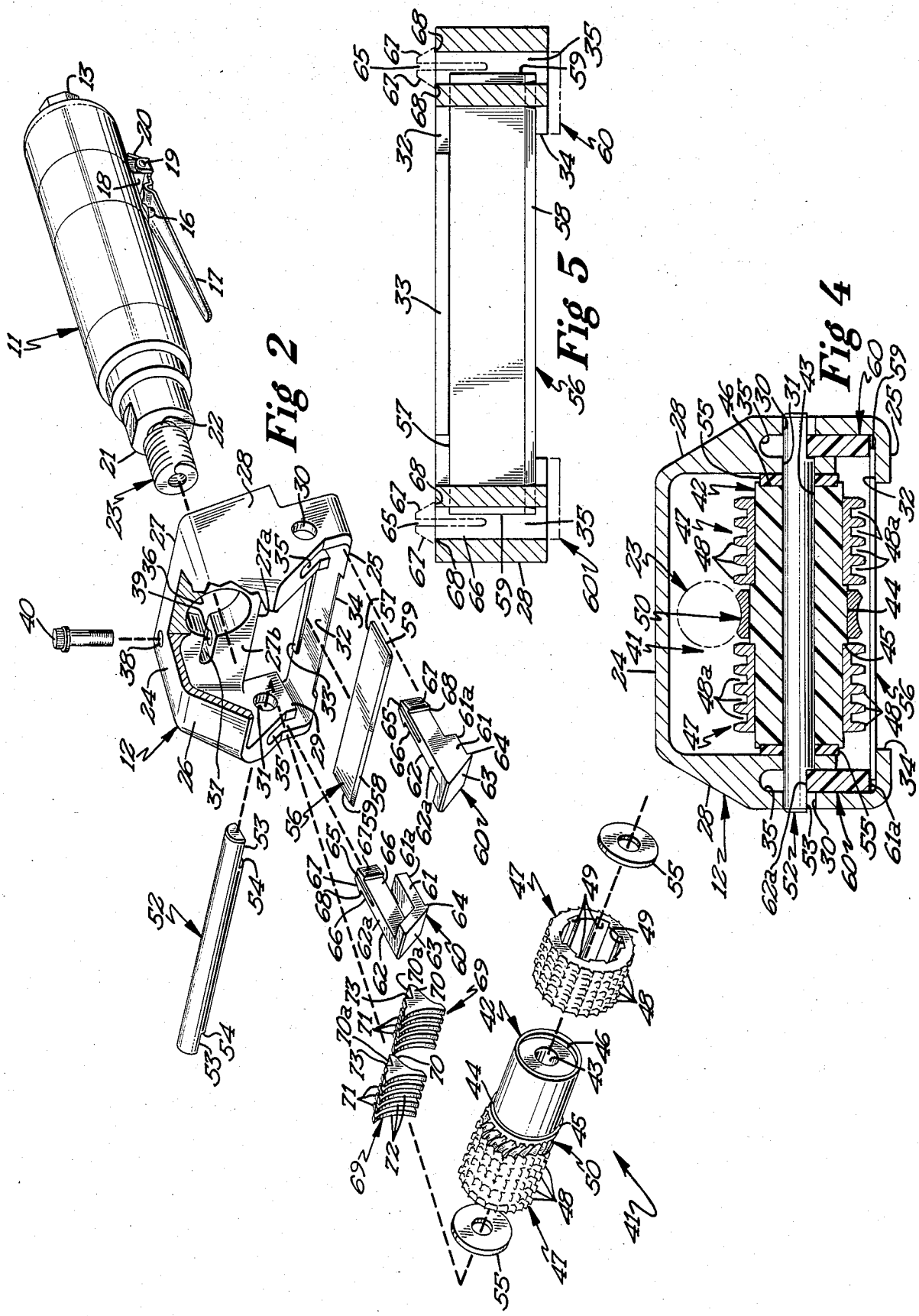

HAND SKINNER DEVICE

This invention relates to a skinner device and, more particularly, to a hand skinner device.

BACKGROUND OF THE INVENTION

There are certain prior art Patents for hand skinner devices which have been developed for the meat packing industry, but none of them have ever found commercial acceptance.

For example, U.S. Pat. No. 4,071,923 shows a hand skinner device in which the skinning blade and gripper roll are offset with respect to the handle. U.S. Pat. No. 4,186,461 discloses a two-way hand skinning device, and U.S. Pat. No. 4,451,953 discloses a hand skinner device having a cam lock for locking the blade in place.

However, these prior art devices are somewhat heavy and cumbersome in construction and are expensive to manufacture. It is for these reasons that these prior art devices have never received commercial acceptance.

SUMMARY OF THE INVENTION

It is, therefore, a general object of this invention to provide a novel and improved lightweight hand skinner device which may be inexpensively constructed.

Another object of this invention is to provide a novel and improved hand skinning device which utilizes a pair of multi-functional clips to retain the blade and gripper roll in assembled condition.

A further object of this invention is to provide a novel and improved hand skinner device, including a skinning blade which is mounted for limited lateral floating movement to minimize the occurrence of dull spots along the cutting edge of the blade.

These and other objects are more fully defined in the following Specification.

FIGURES OF THE DRAWING

FIG. 1 is a perspective of the hand skinner fully assembled;

FIG. 2 is an exploded perspective of the hand skinner;

FIG. 3 is a sectional view of the hand skinner taken along the lines 3—3 of FIG. 1 and looking in the direction of the arrows;

FIG. 4 is a sectional view of the hand skinner taken along the lines 4—4 of FIG. 3 looking in the direction of the arrows and showing the tooth roll assembly;

FIG. 5 is a sectional view of the hand skinner taken along the lines 5—5 of FIG. 3 looking in the direction of the arrows and showing the disposable blade; and FIG. 6 is a sectional view of the hand skinner taken along the lines 6—6 of FIG. 1 looking in the direction of the arrows and showing the details of the construction of the retaining clip.

DESCRIPTION OF THE PREFERRED EMBODIMENT

Referring now to FIGS. 1 and 2, it will be seen that the novel hand skinning device, designated generally by the reference numeral 10, is thereshown. The hand skinner device 10 includes an elongate generally cylindrical handle 11 having a housing 12 secured to the front end thereof. The handle 11 actually comprises the housing of an air motor and the rear end portion of the handle is provided with a fitting 13, which is connected to an elongate air hose 14 by a coupling 15. The air hose 14 is connected to a source of air and operates the air motor handle 11 when the air motor is energized. In this regard, the air motor may be Model No. DL051A30RS, manufactured by Aro Corporation.

The handle is provided with a control valve (not shown) which is contained within the handle 11, the control valve having a spring urged valve actuator element 16 which projects outwardly through an opening in the handle 11. An elongate actuator lever 17 is pivotally mounted on a bracket 18 by a pivot 19 and the bracket is secured to the handle to permit pivoting movement of the actuating lever 17 relative to the handle 11. It will be noted that the shorter arm of the actuating lever 17 is provided with an angularly extending stop element 20 which projects therefrom and which limits swinging movement of the actuating lever away from the handle 11 in an inoperative direction. It will be appreciated that when the actuating lever is moved upwardly towards the handle 11, the actuating lever will engage the valve actuator element 16 to depress the same and to energize the air motor.

The front end of the handle 11 is provided with a reduced portion 21, as best seen in FIG. 2, and the threaded output shaft 22 of the air motor projects forwardly therefrom. The threaded output shaft 22 is threadedly engaged by a worm gear 23 whereby, when the air motor is energized, the shaft 22 and worm gear mounted thereon will be rotated.

The housing 12 of the hand skinner device includes a substantially flat top wall 24, a substantially flat rectangular shaped lower wall 25, a forwardly and downwardly declined front wall 26 which is integral with the top wall. The housing also includes a generally vertically disposed rear wall 27, opposed, substantially vertically disposed outer side walls 28, and a pair of vertically disposed inner side wall elements 29, which are integral with the outer side wall elements 28, and are spaced laterally inwardly therefrom. The housing 12 is formed of hard coat annodized aluminum. It will be noted that the lower edges of the front and rear walls are spaced above the lower wall 25.

It will also be noted that the lower wall 25 has a substantially flat upper surface 32 and is provided with an upwardly projecting stop element 33 adjacent its rear edge. The lower wall is also provided with a recess 34 in its front edge, as best seen in FIG. 2. It will be seen that the inner side wall elements 29 are each spaced inwardly from the associated outer wall element 28 to define a vertical rearwardly extending recess 35 therein.

The rear wall 27 has an opening 36 therein which communicates with a laterally extending slot 37. The top wall of the housing has a vertical opening 38 therein which is disposed in alignment with a thread or tapped opening 39 which communicates with the slot 37. A bolt 40 extends through the opening 38 and threadedly engages the threaded portion 39. It will be seen that, when the reduced end portion 21 of the handle 11 is positioned in the opening 36, and the bolt 40 is thereafter tightened, the housing 12 will be clamped to the handle 11.

The hand skinner device 10 also includes a tooth roll assembly 41 which is comprised of an elongate one-piece generally cylindrical support member 42 formed of delrin. The cylindrical support member 42 has a cylindrical opening 43 therethrough and has an enlarged central annular element 44 integral therewith and projecting radially outwardly therefrom. The annular element 44 defines a pair of oppositely facing annular shoulders 45. It will also be noted that each end of the cylindrical support member 42 has a recess 46 therein.

The tooth roll assembly 41 also includes a pair of substantially identical tooth roll members 47, each being formed of stainless steel, and each including a plurality of teeth 48 which are arranged in circumferentially extending and axially spaced apart rows to thereby define an annular recess 48a between adjacent rows. The inner surface of each tooth roll member 47 is provided with splines 49 that project inwardly therefrom. The tooth roll assembly also includes a generally cylindrical ring gear 40 which is also provided with splines 51 on its inner cylindrical surface.

The inner diameter of the ring gear 50 is larger than the exterior diameter of the cylindrical support member, but the splines on the rear gear will engage and inscribe the exterior surface of the annular element 44 when the ring gear is forced upon the annular element. This locks the ring gear on the annular element against rotation relative thereto. Similarly, when the tooth roll members are forced upon the end portions of the sleeve, the splines on the tooth roll members will engage and inscribe the surface of the cylindrical support member to lock the tooth roll members against rotation relative to the support member. It is also pointed out that the inner ends of each tooth roll member will engage one of the shoulders 45 of the annular element 44 to axially space the end of each tooth roll member from the ring gear 50.

The tooth roll assembly 41 also includes an elongate shaft 52 which is of cylindrical construction and which projects through the opening 43 in the cylindrical support member 42. It will be noted that the shaft 52 has flat end portions 53 and these flat surfaces 53 define outwardly facing shoulders 54. It is also pointed out that the tooth roll assembly 41 also includes a pair of thrust races 55 which are positioned within the end recesses 46 of the cylindrical support member 42 and through which the shaft 52 projects. These thrust races absorb end thrust generated by the tooth roll assembly during operation thereof.

The hand skinner device 10 also includes an elongate substantially flat generally rectangular shaped blade 56 having a substantially flat straight rear edge 57 and a front cutting edge 58. The blade also has straight flat end edges 59. It will be noted that the blade is positioned upon the upper surface of the lower wall 25 of the housing and the rear edge 57 thereof engages the stop element 33.

Means are provided for retaining the blade in mounted relation on the lower wall 25 which serves as a blade support member and this means includes a pair of similar clips 60 which are mirror images of each other and each being formed of delrin. Each clip 60 includes a generally flat, horizontal blade engaging portion 61 and a generally flat vertical shaft engaging portion 62 integral with the blade engaging portion and projecting upwardly therefrom. Each clip also includes a generally flat front upwardly inclined marker portion 63 which is integral with the blade engaging portion and the shaft engaging portion. Each clip also has a downwardly projecting lip 64 which extends downwardly from the marker portion and each blade engaging portion has a vertical slot 65 through its rear end portion to define a pair of rearwardly projecting vertical retaining elements.

The retaining elements 66 each have a rear bevel cam surface 67 which defines a vertical retaining shoulder 68. With this arrangement, when the clips are inserted into the recesses 35, the flat blade engaging portion will engage a blade supported upon the blade supporting lower wall 25. The retaining elements will project through the associated recess 35 and will be cammed inwardly until the shoulders 68 pass the rear edges of the inner and outer wall elements to releasably lock the clips in place.

It will be appreciated that, when the hand skinner device is assembled, the shaft 52 will project through the openings 30 and 31 in the inner and outer wall elements and the tooth roll will be positioned above the blade 56. The flat surfaces 53 of the shaft 52 will face downwardly and will engage the upper surface 62a of the shaft engaging portions 62 to lock the shaft against rotation relative to the housing. It is also pointed out that the shoulder 54 at each end of the shaft 52 will engage the shaft engaging portion 62 of each clip to lock the shaft against axial movement relative to the housing. It will also be appreciated that, when the hand skinner device is in the assembled condition, the lower surface 61a of the blade engaging portion 61 of each clip will engage the upper surface of the end edges 59 of blade 56, and the adjacent vertical surface of the associated clips. This arrangement permits lateral translation of the blade 56 to a limited degree and this is important in minimizing the occurrence of dull spots along the cutting edge 58 of the blade.

The hand skinner device 10 also includes a pair of identical tooth roll clean-up bar members 69, each of which is formed from Teflon infused hard coat annodized aluminum and each including a rear bar element 70 that extends horizontally and transversely of the housing. Each clean-up bar member has a plurality of vertical laterally spaced apart substantially identical fingers integrally formed with the bar element 70 thereof. It will be noted that the fingers 71 present a concavely curved front surface whose radius of curvature corresponds generally to the extension surface of the tooth roll members 47. Each finger 71 projects into the annular space 48a defined between an adjacent pair of circumferential axially spaced apart rows of teeth for each tooth roll member. It will also be noted that the rear bar element 70 of each clean-up bar member has a substantially flat upper surface 70a and each finger 72 also presents a vertical rear surface 73.

When the hand skinner device is in the assembled condition, the fingers of each clean-up bar 69 will be positioned in the annular spaces 48a of each tooth roll member and the upper surface 70a of the bar element will engage the lower edge surface 27a of the rear wall member 27. Similarly, the vertical rear surface 73 of each finger will engage the front vertical surface 27b of each wall member 27 when the hand skinner device 10 is in the assembled condition. With this arrangement, the clean-up bar members are wedged between the tooth roll members and the rear wall of the housing 12 when the device is in the assembled condition.

The clean-up bar members perform the function of preventing the accumulation of skin and particles of meat from clogging the annular recesses between adjacent circumferential rows of teeth. It is also pointed out that, since the clean-up bar members are formed of Teflon infused annodized aluminum, the coefficient of friction between the clean-up bar members and the tooth roll members is substantially reduced from that ordinarily expected when conventional metallic alloys are used.

The hand skinner device may be used to remove strips of skin or small portions of skin from animal carcasses by a user. To operate the hand skinner device, a user will grip the actuating lever to operate the control valve element 16. The motor will be energized, thereby rotating the tooth roll and the tooth roll assembly will urge the skin against the cutting edge of blade 56. The removed skin will pass through the opening located below the rear wall 27.

When it is desirable to disassemble the hand skinner device for cleaning or replacement of parts, it is only necessary to squeeze the retaining elements 66 for each clip 60 towards each other to disengage the shoulders 68 from the rear edges of the inner and outer side wall elements. The clips may then be removed by pulling the clips forwardly from the recesses 35. The blade 56 may then be removed, as well as the shaft 52, and, thereafter, the tooth roll assembly. It will, therefore, be seen that the clips 60 not only serve to hold the blade against the lower wall portion of the housing, but also clamp the shaft against axial and rotative movement relative to the housing. The clips 60 also permit limited lateral translation of the blade so that the blade will not wear excessively at the areas adjacent the marker portions 63 of the clips.

The hand skinner may be readily assembled by tightening the bolt 40 to clamp the housing on the handle and by positioning the blade on the lower wall portion 32. The tooth roll may then be mounted in the housing on the shaft 52, and the clips may be inserted into the recesses 35 to hold the blade and tooth roll assembly in place. The unique construction and multi-functional characteristics of the clips 60 permit construction of the hand skinner device so that it may be readily assembled and disassembled with a minimum of effort.

Thus, it will be seen that I have provided a novel hand skinner device, which is not only of simple, inexpensive and lightweight construction, but one which functions in a more efficient manner than any heretofore known comparable prior art device.

What is claimed is:

1. A hand skinning device comprising:
   an elongate handle,
   a housing mounted on one end of said handle including a horizontal lower wall portion and a pair of side wall portions,
   a tooth roll assembly revolvably mounted on said housing including an elongate shaft and a tooth roll structure journaled on said shaft,
   a blade positioned on said horizontal lower wall portion of said housing below said tooth roll assembly, and
   clamping means engaging said housing and engaging and clamping said blade downwardly on the lower wall portion of said housing and engaging said shaft to releasably lock the same on the housing.

2. The hand skinning device as defined in claim 1 wherein said clamping means includes a pair of similar clips, each having a blade engaging surface engaging the upper surface of said blade to clamp the same downwardly against said lower wall portion of the housing.

3. The hand skinning device as defined in claim 1 wherein said housing is of one-piece construction, said blade being clamped by said clamping means against said lower wall portion and permitting limited lateral translation of the blade relative to said lower wall portion.

4. The hand skinning device as defined in claim 2 wherein said clips engage said shaft to clamp the same on said housing against axial and rotary movement.

5. The hand skinning device as defined in claim 4 wherein each end of said shaft is provided with a flat surface, said clips being vertically disposed on said housing and each clip having an upper surface engaging said flat surface at one end of said shaft.

6. The hand skinning device as defined in claim 5 wherein said flat surfaces of said shaft each defines a shoulder engaged by one of said clips to prevent axial movement of said shaft relative to said housing.

7. The hand skinning device as defined in claim 4 wherein each of said clips includes a substantially flat, horizontal blade engaging portion and a substantially flat, vertical shaft engaging portion.

8. The hand skinning device as defined in claim 7 wherein said clips are formed of a non-metallic material.

9. The hand skinning device as defined in claim 4 wherein said tooth roll structure includes an elongate sleeve formed of non-metallic material and having an inner cylindrical surface, a ring gear mounted on said sleeve adjacent the central portion thereof, and a pair of identical, generally cylindrical tooth roll members engaging opposite end portions of said sleeve in fixed relation therewith.

10. The hand skinning device as defined in claim 9 wherein said sleeve is formed of plastic and has a substantially smooth outer surface, each tooth roll member having a plurality of axially extending radially spaced apart splines on the inner cylindrical surface thereof, the splines of each tooth roll member engaging and inscribing the outer surface of said sleeve to lock the tooth roll members thereon against rotation relative to the sleeve.

11. The hand skinning device as defined in claim 2 wherein each clip has an upper surface engaging said shaft to lock the same against axial and rotary movement relative to the housing, and each clip having a lower surface engaging and clamping the blade against said lower horizontal wall portion, but permitting limited lateral movement of the blade relative to the horizontal lower wall portion.

12. The hand skinning device as defined in claim 2 and means on said housing defining a pair of rearwardly extending vertical recesses therein, each recess being located adjacent one side wall portion of the housing, each of said clips having front and rear end portions, the rear end portion of each clip having a retaining element thereon frictionally engaging in one of said recesses in said housing.

* * * * *